Figure 3:
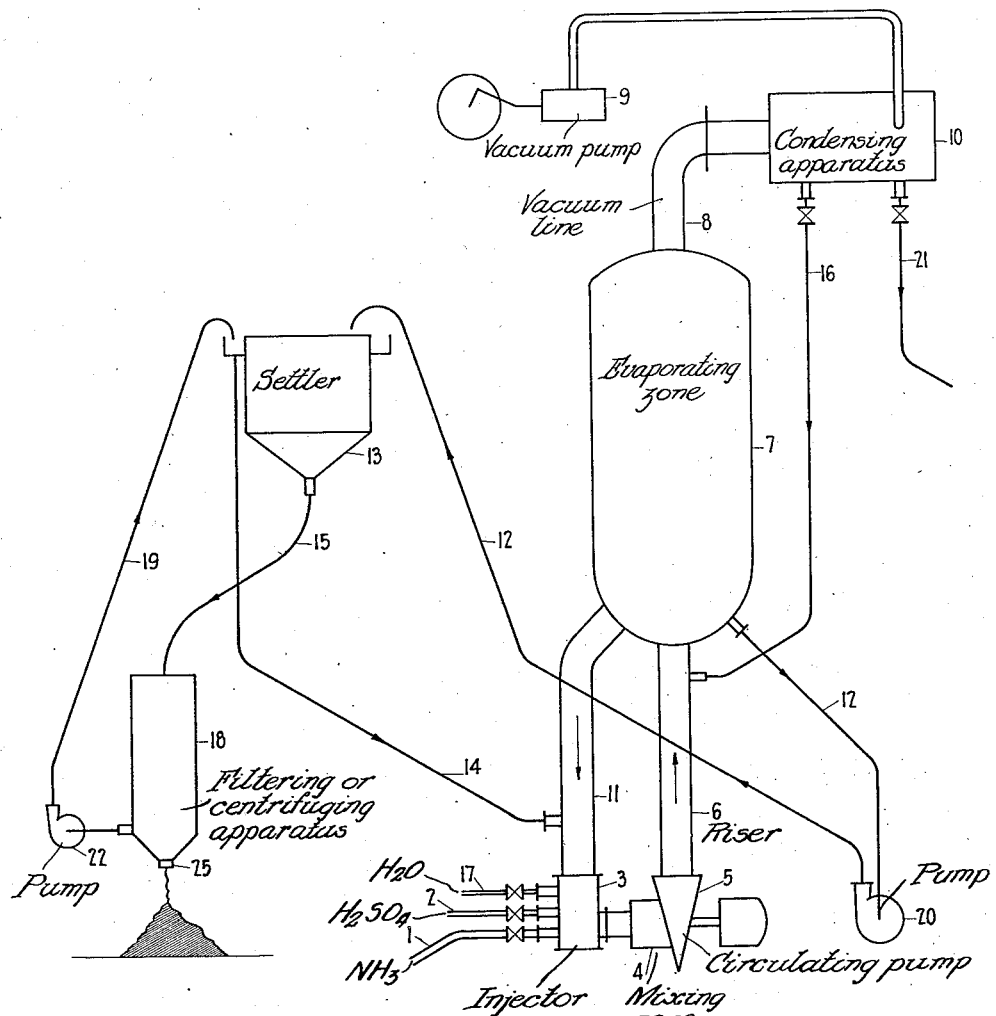

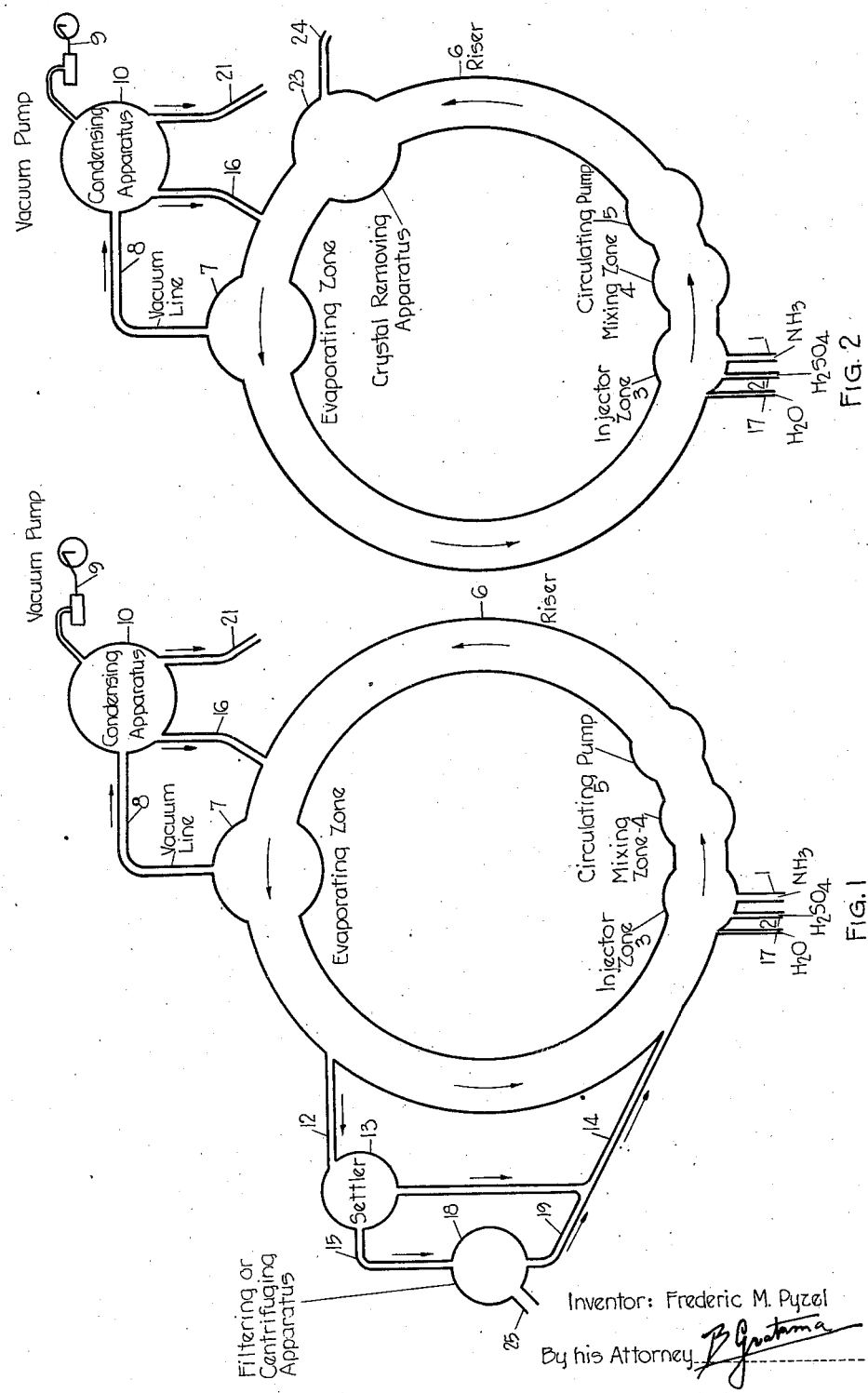

Patented Jan. 22, 1935

1,988,701

UNITED STATES PATENT OFFICE 1,988,701

PROCESS FOR THE MANUFACTURE OF AMMONIUM SULPHATE

Frederic Marinus Pyzel, Piedmont, Calif., assignor to Shell Development Company, San Francisco, Calif., a corporation of Delaware Application August 14, 1931, Serial No. 557,126

4 Claims. (Cl. 23—119)

This invention is more specifically concerned with a method of forming ammonium sulphate in a cyclic system.

In manufacturing ammonium sulphate from ammonia gas and sulphuric acid it is the usual practice to bubble ammonia gas through a bath or saturator containing sulphuric acid and ammonium sulphate. The crystals of ammonium sulphate formed are removed from the saturator to suitable refining apparatus.

In by-product coke works the gas injected contains a relatively small ammount of ammonia and therefore a large amount of the reaction heat is removed by the inert gases. However, with the use of pure ammonia gas or liquid anhydrous ammonia the heat of reaction cannot readily be removed. Various attempts have been made to dispose of this excess heat.

I have found that by conducting the reaction in a circulating system the heat of reaction can be readily removed. Another advantage of my system which makes it useful both in the manufacture of ammonium sulphate using dilute ammonia or acid as well as in processes which make use of concentrated reacting materials is that the acidity of the liquid in the apparatus can be regulated thus allowing accurate control of one of the factors affecting crystal size. By the use of my circulating system I can also obtain intense mixing of the reaction materials assuring uniform conditions of temperature and concentration throughout the system. It is a lack of uniformity of conditions which characterizes the ordinary saturator and which has made the controlling of crystal size in the ordinary saturator very difficult.

The further advantages of my invention will be better and more fully understood from the following detailed description, throughout which reference is made to the attached drawings.

Fig. I is a schematic flow diagram.

Fig. II is an alternate form of flow diagram.

Fig. III is a view in elevation of apparatus with flow similar to Fig. I.

Referring to Figs. I and III, an ammonia line (1) and a sulphuric acid line (2) discharge into an injector zone (3). The mixed acid and ammonia flow into a mixing zone (4) where they become more completely mixed with liquid already in the system.

From the mixing zone the stream is forced by the circulating pump (5) through a riser pipe (6) into an evaporating zone (7). Connected to the top of this zone there can be a vacuum line (8) which terminates in a vacuum pump (9).

A condensing apparatus (10) is interposed between the evaporating zone and the vacuum pump. On leaving the evaporating zone some of the stream returns to the injector zone (3) by way of pipe (11) while part of the stream is diverted through pipe (12) to a settler (15). In Fig. III this is accomplished by means of pump (20).

The liquid separated from the crystals in the settler flows through (14) and unites with the main flow.

Under certain conditions I may only remove the larger crystals in (13) and return the smaller crystals together with the mother liquor to the main circulating stream.

From the settler (13) the crystals are removed to suitable filtering or centrifuging apparatus (18) through pipe (15). The mother liquor is returned to the main stream through pipes (19) and (14). In Fig. III a pump (22) is used to force the mother liquor through line (19). The crystals are removed from (18) through (25).

Any water vapor withdrawn through the vacuum line (8) is condensed in condenser (10) and may be returned to the system through pipe (16). Surplus condensate is led off by pipe (21). If additional water is necessary it may be added to the system from a water pipe (17).

In this system there exists a balance of materials; therefore, if water is continuously added in conjunction with the reacting materials, as for example, when operating with dilute sulphuric acid, it will not be possible to return to the stream all the water vapor withdrawn from the evaporator zone (7), and the surplus water is removed from the condenser through pipe (21).

Ammonia and sulphuric acid are forced in combining proportions into the injector zone which is at the lowest point in the system. Upon mixing the ammonia and sulphuric acid combine forming ammonium sulphate.

From the lower level the stream rises in (6) to a higher level and in so doing the hydrostatic pressure on the stream decreases and its boiling point is therefore reduced. This causes evaporation of some of the water in the stream, resulting in the formation of new crystals of ammonium sulphate and also in the growth of crystal nuclei already existant.

As the evaporating zone can be maintained under vacuum the boiling point of the stream may be further lowered by the operation of vacuum pump (9).

A considerable amount of heat is generated when the ammonia and sulphuric acid combine. This heat is readily dissipated by the circulating stream as the stream is of large volume compared to the volume of reacting materials injected. The presence of water in the circulating stream prevents the temperature rising above a certain point. Any appreciable rise in temperature in the system will cause evaporation of some of the water present.

The maximum temperature of the system is controlled by the boiling point of the water in the system because any units of heat present in excess of those necessary to maintain the temperature of the system at the boiling point of the water in the system will be absorbed as latent heat of vaporization.

As a variation of the system I may use a crystal removing apparatus connected between the circulating pump and the evaporating zone as shown at (23) in Fig. II. In Fig. II the whole stream passes through the apparatus (18) and the crystals are removed through (24) whereas in Fig. I only part of the stream is subjected to the crystal removing operation during each circulation.

The amount of turbulence and mixing in either system is readily controlled by regulating the speed of the circulating pump.

My process enables different concentrations of the reacting materials to be used. Thus I may use waste gases and acids from various sources instead of concentrated ammonia gas and sulphuric acid.

I claim as my invention:

1. A process of forming ammonium sulphate comprising: injecting ammonia and sulphuric acid into a fluid stream in a cyclic system at the lowest point in said system, mixing the reacting materials with a fluid stream already in the system, circulating the stream through the system, withdrawing part of the stream at each circulation and removing the crystals from the part of the stream withdrawn.

2. A process for the manufacture of ammonium sulphate comprising: injecting ammonia and sulphuric acid into a circulating liquid stream, thereafter reducing the hydrostatic pressure on said stream, withdrawing part of said circulating stream of liquid, removing crystals from said withdrawn liquid and returning the mother liquor to said circulating stream.

3. In a process for the manufacture of ammonium sulphate the steps comprising: maintaining ammonium sulphate solution in a vessel, withdrawing a stream from said vessel, increasing the hydrostatic pressure on said stream, injecting ammonia and sulphuric acid into the stream at the point of highest hydrostatic pressure, reducing the pressure on the stream and returning said stream to said first mentioned vessel.

4. Process of forming ammonium sulphate which comprises injecting ammonia and sulphuric acid into a liquid stream in a cyclic system, maintaining the system under vacuum and circulating the liquid stream through the system.

FREDERIC MARINUS PYZEL.